United States Patent [19]
Childress

[11] 4,352,370
[45] Oct. 5, 1982

[54] PRESSURE VESSEL VALVE HOUSING

[76] Inventor: Steve Childress, P.O. Box 853, Richland, Va. 24641

[21] Appl. No.: 197,478

[22] Filed: Oct. 16, 1980

[51] Int. Cl.[3] .............................................. F16K 35/00

[52] U.S. Cl. .................................. 137/382; 137/383; 220/85 P

[58] Field of Search ......................... 70/178, 230, 232; 137/382, 383; 220/85 P

[56] References Cited

U.S. PATENT DOCUMENTS

| | | | |
|---|---|---|---|
| 929,973 | 8/1909 | McNutt | 137/383 X |
| 2,080,728 | 5/1937 | MacNeill et al. | 220/85 P |
| 2,278,232 | 3/1942 | Anderson | 220/85 P UX |
| 2,593,533 | 4/1952 | Cammarato | 220/85 P |
| 3,185,336 | 5/1965 | Goss | 220/85 P X |
| 3,476,288 | 11/1969 | Sherrill | 220/85 P |
| 3,722,533 | 3/1973 | Connolly | 137/382 |
| 3,831,802 | 8/1974 | Chambers et al. | 220/85 P X |
| 3,848,768 | 11/1974 | Griffin | 220/85 P |
| 4,030,628 | 6/1977 | Hippert, Jr. | 220/85 P |

*Primary Examiner*—Gerald A. Michalsky
*Attorney, Agent, or Firm*—Littlepage & Webner

[57] ABSTRACT

One half of the valve housing is mounted on a strap which is tightened around a pressure vessel by a clamp screw. The other half of the housing is pivoted to the first so that it can be swung open to expose the valve. The other half can be locked to the strap to prevent opening and, when so locked, the clamp screw is blocked so that the strap cannot be loosened to slip off the pressure vessel.

1 Claim, 4 Drawing Figures

Fig. 1
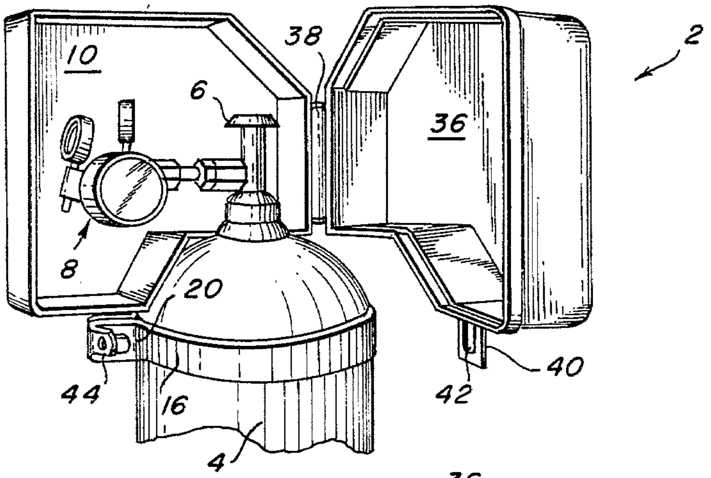
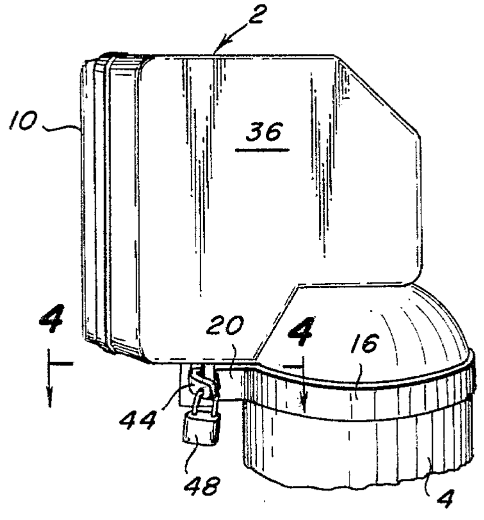
Fig. 2
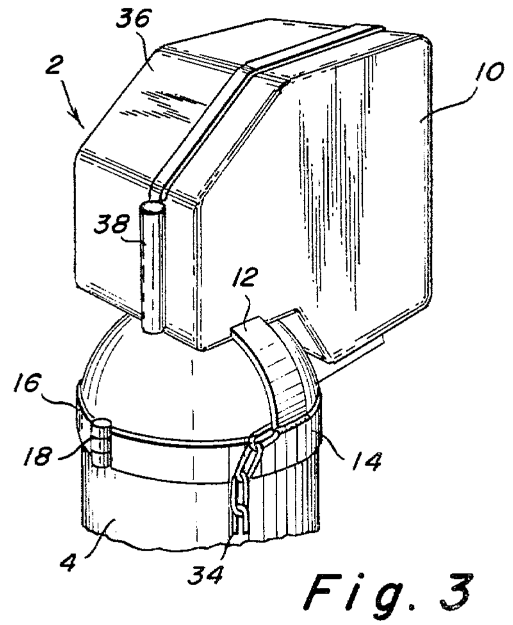
Fig. 3
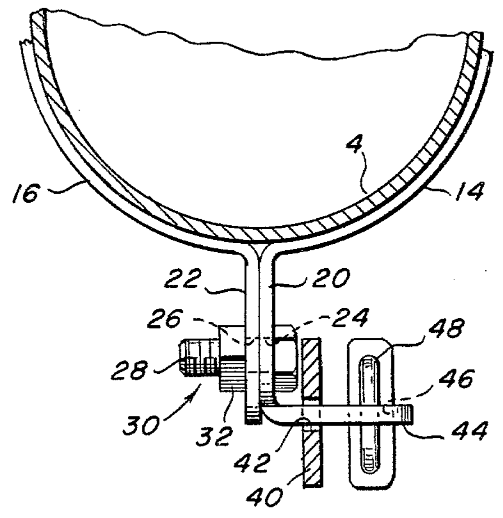
Fig. 4

PRESSURE VESSEL VALVE HOUSING

FIELD OF INVENTION

Metallic Receptacles, Attachments, Valve Protectors.

PRIOR ART

U.S. Patents to Jaeger No. 1,948,966; McNeill et al. No. 2,080,728; Anderson No. 2,278,232; Commarato No. 2,593,533; Gross No. 3,185,336; Connolly No. 3,722,533; Chambers et al. No. 3,831,802; and Griffin No. 3,848,768.

OBJECTS

The primary object of this invention is to provide a housing for the valve and associated gauge and/or coupling members of a pressure vessel, such as a gas cylinder, which housing can be opened to furnish access to the valve and locked to prevent vandalization or tinkering.

When gas pressure vessels are left unguarded, they are subject to vandalism, particularly by children or juvenile ruffians. They open valves so as to discharge the vessel's contents, oftentimes creating fire hazard, and harm gauges and otherwise perform mischievous mischief. Fortunately, persons of this sort do not ordinarily have ready access to strong and forceful tools or torches and hence, a housing that will ward off casual miscreants and which will keep at bay for a while the more resourceful of the delinquents is quite useful.

To this end it is proposed now to provide a housing for clamping onto the valve-end of a gas cylinder, which housing can be opened to provide access to the valve and associated gauges as fittings and then locked closed; and when so locked it masks the clamp so that the latter cannot be loosened.

These and other objects will be apparent from the following specification and drawing, in which:

FIG. 1 is a side elevation of the valve end of a typical gas cylinder, showing the housing open clamped in place;

FIG. 2 is a view similar to FIG. 1, but showing the housing locked closed;

FIG. 3 is a view of the rear side of the closed housing; and,

FIG. 4 is a fragmentary cross-section along the line 4—4 of FIG. 2 looking in the direction of the arrows.

Referring now to FIG. 1 of the drawings, in which like numerals denote similar elements, the valve housing 2 is shown open and installed on the upper end of a gas cylinder 4 having the usual valve 6 and gauges 8. Housing 2 has a fixed shell 10 which is rigidly affixed by means of an arm 12 onto one half of a clamp strap 14, the other half of strap 16 being pivoted to the first half 14 as at 18. On the free ends of strap halves 14 and 16 are flatwise-mating ears 20 and 22 which have apertures 24 and 26 therethrough, through which the shank 28 of a clamp bolt 30 engages. Clamp bolt 30 threadedly engages a nut 32 welded onto the outer side of ear 22. When clamp bolt is moved forwardly, it tightens the strap around the vessel and when unscrewed rearwardly it loosens the strap so as to permit removal from the vessel. A chain 34 secured, for example, on one of the halves of the clamp strap may be used for anchoring the assembly to a suitable stationary member.

Housing 2 includes a pivoted closure 36 which mates with the fixed shell 10, and is hinged thereto by a pivot 38 which cannot easily be disassembled. Depending from the pivoted closure 36 of the housing is a hasp 40 having an aperture 42 which engages over a tab 44 projecting from the free end of ear 20, and adjacent the free end of tab 44 is a lock hole 46 through which the hasp of a lock 48 engages.

When the closure and fixed shell of the housing are locked together, the hasp 40 depending from the closure of the housing masks the head of bolt 30 blocks the bolt against unscrewing from the nut 32. This prevents loosening of the clamp strap enough for removal from the cylinder until the lock has been removed and the closure swung open.

I claim:

1. In combination a cylindrical pressure vessel having a valve on one end thereof, a housing for enclosing said valve, said housing comprising;

- a strap embracing the cylindrical pressure vessel and comprised of two semi-cylindrical parts pivoted together at one end and having mating radially-outwardly extending ears on their other ends,
- nut and bolt means for clamping said ears together,
- a shell comprised of first and second mating shell parts, the first of said shell parts being affixed to one of the strap parts and extending upwardly therefrom, the second of such shell parts being pivotally attached to the first shell parts so as to swing between closed and open positions whereby to enclose and expose the valve,
- the second of said shell parts having a projection rigid therewith and extending downward therefrom, said projection, in the closed position of said second shell part, being disposed in blocking position over the nut and bolt means such as to prevent unbolting thereof and in the open position of such second said shell part being disposed in unblocking position with respect to said nut and bolt means,
- and lock means for releasably holding said second shell part in said closed postion.

* * * * *